United States Patent [19]

Petersen

[11] Patent Number: 4,501,139
[45] Date of Patent: Feb. 26, 1985

[54] TEST SYSTEM FOR TESTING FRONT WHEEL DRIVE COMPONENTS OF AUTOMOBILES

[75] Inventor: Paul S. Petersen, Minnetonka, Minn.

[73] Assignee: MTS Systems Corporation, Eden Prairie, Minn.

[21] Appl. No.: 526,920

[22] Filed: Aug. 26, 1983

[51] Int. Cl.³ .............................................. G01M 15/00
[52] U.S. Cl. .................................... 73/118; 73/432 SD
[58] Field of Search ...................... 73/118, 162, 432 V, 73/432 SD

[56] References Cited

U.S. PATENT DOCUMENTS

| 926,513 | 6/1909 | Souther . | |
|---|---|---|---|
| 1,479,338 | 1/1924 | Thomas . | |
| 2,157,903 | 5/1939 | Lapsley | 73/51 |
| 2,316,253 | 4/1943 | Keinath | 73/51 |
| 2,371,607 | 3/1945 | Collins | 64/24 |
| 3,195,350 | 7/1965 | Reed | 73/162 |
| 3,605,488 | 9/1971 | Foster | 73/100 |
| 3,690,168 | 9/1972 | Petersen | 73/162 |
| 3,696,663 | 10/1972 | Klinger | 73/91 |
| 3,713,330 | 1/1973 | Lentz | 73/93 |
| 3,739,632 | 6/1973 | Miller et al. . | |
| 3,796,092 | 3/1974 | Klinger et al. | 73/99 |
| 4,089,211 | 5/1978 | Vercellone et al. | 73/93 |
| 4,263,809 | 4/1981 | Petersen et al. | 73/798 |
| 4,391,131 | 7/1983 | Scourtes | 73/118 |

FOREIGN PATENT DOCUMENTS 186168 9/1966 U.S.S.R. ............................. 73/162

OTHER PUBLICATIONS

Newsletter, SKF Group News, published by Olle Warneby, Goteborg, Sweden, No. 33, pp. 1-10, Jun. 1982.
Newsletter, SKF Engineering & Research Centre, E.R.C. in action, Issue No. 8, Dec. 1981.

*Primary Examiner*—Jerry W. Myracle
*Attorney, Agent, or Firm*—Kinney & Lange

[57] ABSTRACT

A test system uses the four square principle for loading front wheel drive units of automobiles under torque, and provides the necessary loads on the front wheel drive unit for adequate testing. The unit under test may be subjected to "steering" loads; to torque; to axial loads; and to "jounce" which simulates vertical loads on front wheel drives of automobiles caused by road irregularities, holes or other obstacles. The present device permits application of all of these loads into four separate front-wheel drive-steering units for efficient testing. The mechanical configuration insures the ability to precisely control the loads in the various modes of operation.

19 Claims, 9 Drawing Figures

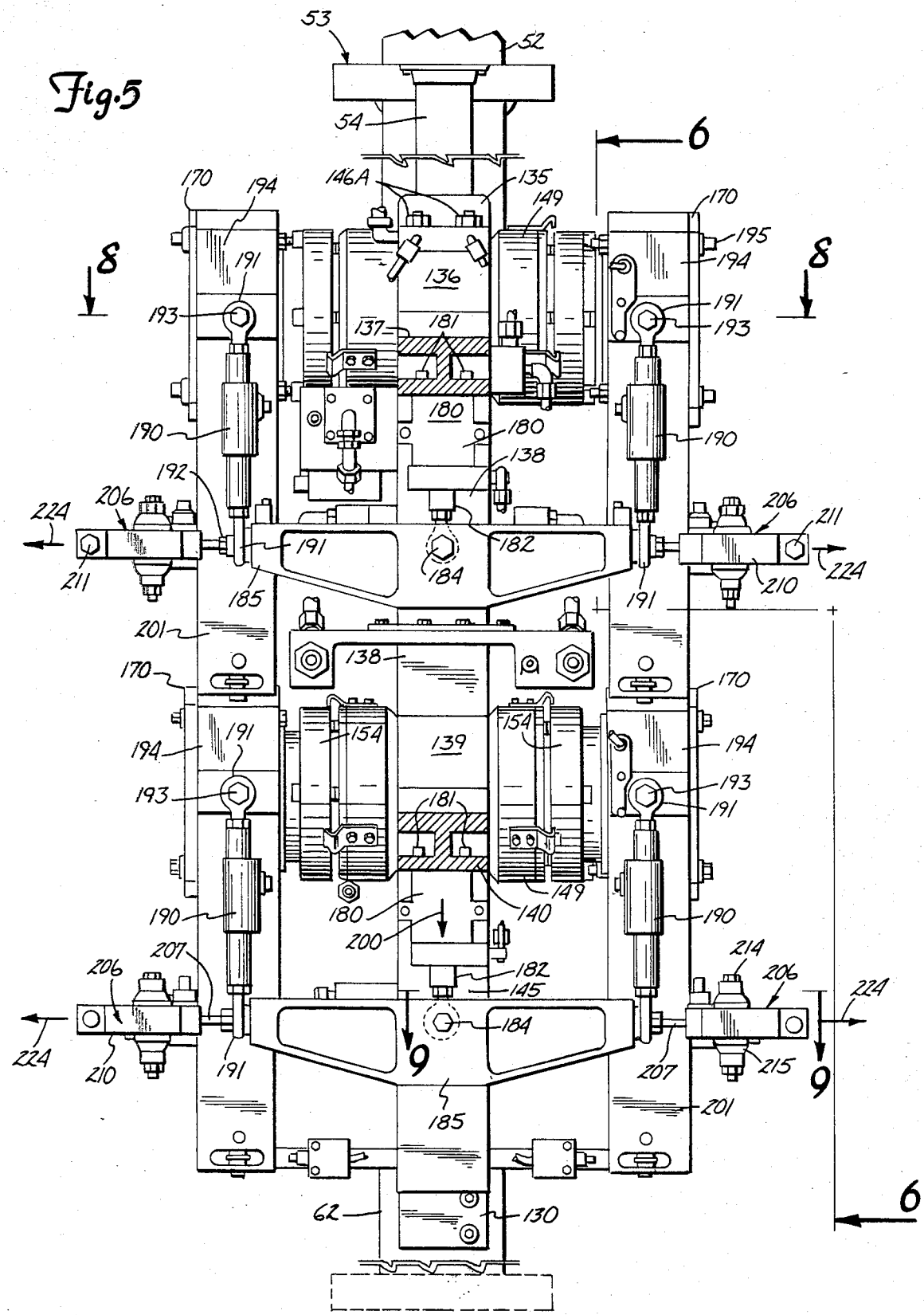

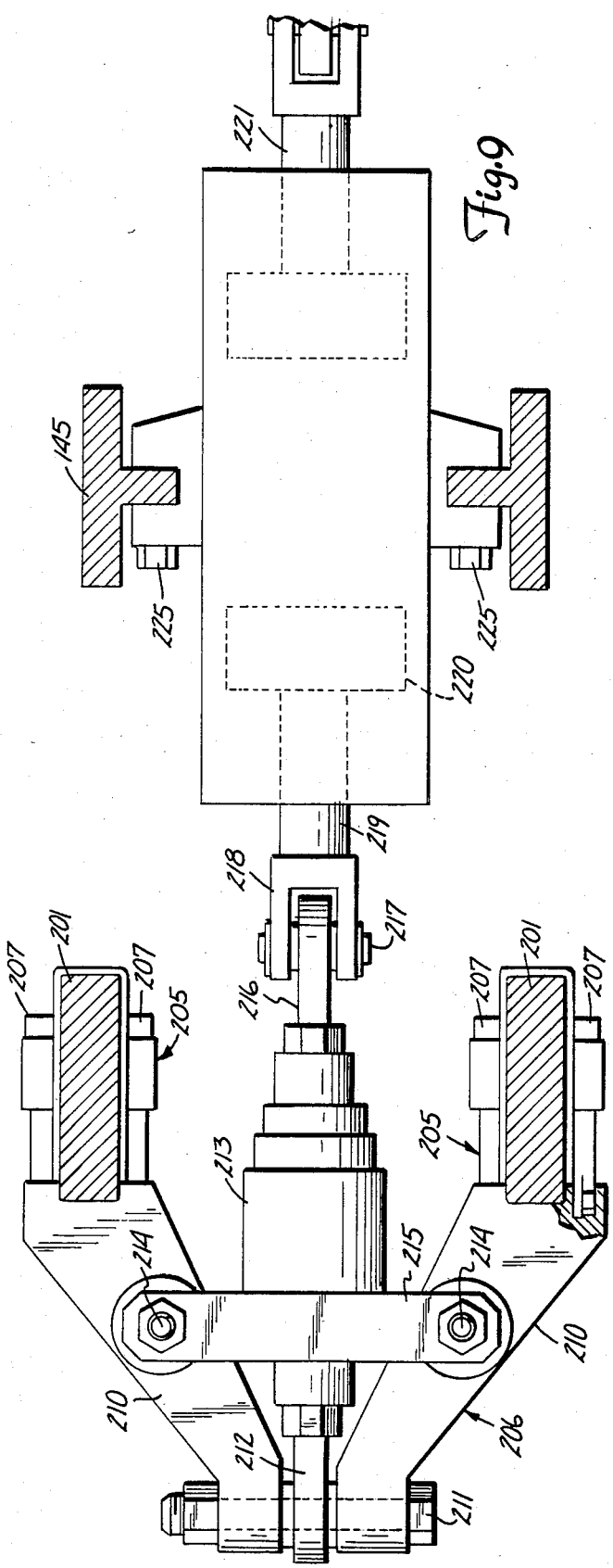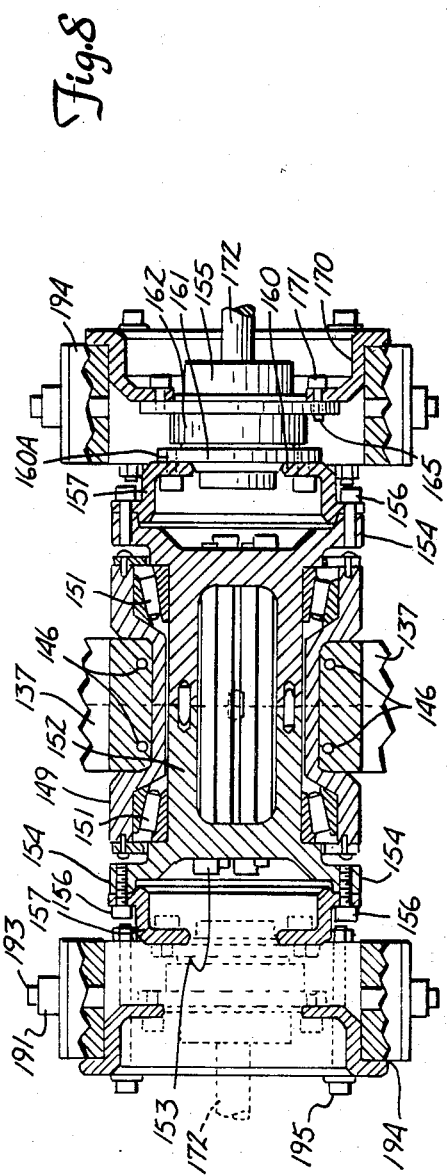

TEST SYSTEM FOR TESTING FRONT WHEEL DRIVE COMPONENTS OF AUTOMOBILES

BACKGROUND OF THE INVENTION

1. Field of the Invention

The present invention relates to a device which will permit applying the necessary loads for testing front wheel drive and steering units for vehicles, and similar devices that require "jounce" input as well as torque and axial loading.

2. Description of the Prior Art

Four square test arrangements have been used for axle testing, utilizing hydraulic actuators for providing torque loads in the past. A typical four square test stand with torque stabilization is shown in U.S. Pat. No. 3,690,168 issued Sept. 12, 1972 to Petersen, and assigned to the same assignee as this application. The teaching of advantages of four square testing and the ability to control the torque in axles being tested in set forth in such patent. Also, the use of hydraulic commutators to provide fluid under pressure to the actuators loading the axles in torque is disclosed.

A type of jounce actuator is shown in U.S. Pat. No. 3,796,092 which issued Mar. 12, 1974 to Klinger et al. A torsion test stand has a center section 11 in this patent which can be moved by a cylinder 17 and the section 11 holds the test specimen between two universal joints. The disclosure is quite schematic, but it does indicate the ability to offset the center section or test section, and the cylinder permits at least some movement of the specimens laterally to their axes.

U.S. Pat. No. 4,089,211 shows an elastomeric bearing test machine which permits loading in several axes. This machine is not a four square setup designed for testing axles and applying jouncing loads.

U.S. Pat. No. 3,713,330 shows means for applying loads along different axes in a test setup, as does U.S. Pat. No. 3,696,663. Other patents which are believed to represent the state of the art include the following:

| U.S. Pat. No. | Inventor |
|---|---|
| 926,513 | Souther |
| 1,479,338 | Thomas |
| 2,157,903 | Lapsley |
| 2,316,253 | Keinath |
| 2,371,607 | Collins |
| 3,195,350 | Reed |
| 3,605,488 | Foster |
| 3,696,663 | Klinger |
| 3,729,632 | Miller |
| 4,263,809 | Petersen et al |

SUMMARY OF THE INVENTION

The present invention relates to an axle testing device in which, in particular, the universal joint used for front wheel drive hubs and axles of vehicles can be placed and subjected to simulated road conditions in an economical, easily controlled, precise manner. The device loads the hubs and axles in torque through the use of a four square test setup; it provides means for rotating the axles; it provides steering movement to simulate steering of a vehicle; it also provides for "jounce" or application of cyclic vertical loads on the test specimens. The jounce may be applied during the time that the test specimens are in a steer mode and while being loaded in torque and also rotated.

Because substantial loads are required, a very rigid frame assembly is needed. The jouncing movement is isolated from the rest of the test frame for ease of control, and for keeping the inertia loading down.

Instrumentation is provided for determining the loads and speeds of the various components as they operate in a conventional manner. The operation may be programmed and controlled using conventional servo controls.

BRIEF DESCRIPTION OF THE DRAWINGS

FIG. 5 is a side view of a center jounce section of the device of FIG. 2 and taken generally along line 5—5 in FIG. 6;

FIG. 8 is a sectional view taken along line 8—8 in FIG. 5;

FIG. 9 is a sectional view taken along line 9—9 in FIG. 5.

DETAILED DESCRIPTION OF THE PREFERRED EMBODIMENT

The test apparatus shown generally at 10 is used for testing rotating specimens, and in particular vehicle front wheel drive units, which have a universal joint in the wheel hub assembly to permit steering the vehicle. The test apparatus, as shown schematically in FIG. 1 has a frame assembly 12 that includes a base plate 13 mounted onto a fixture base 14. The fixture base 14 is supported on a seismic base that is a mass used for isolating the vibrations of the apparatus as it is operated. Isolation layers such as that shown at 16 are provided on the perimeter of the seismic base to isolate it from the concrete floor 18 normally used in the laboratory or test site.

GENERAL CONSTRUCTION

Figure 1:
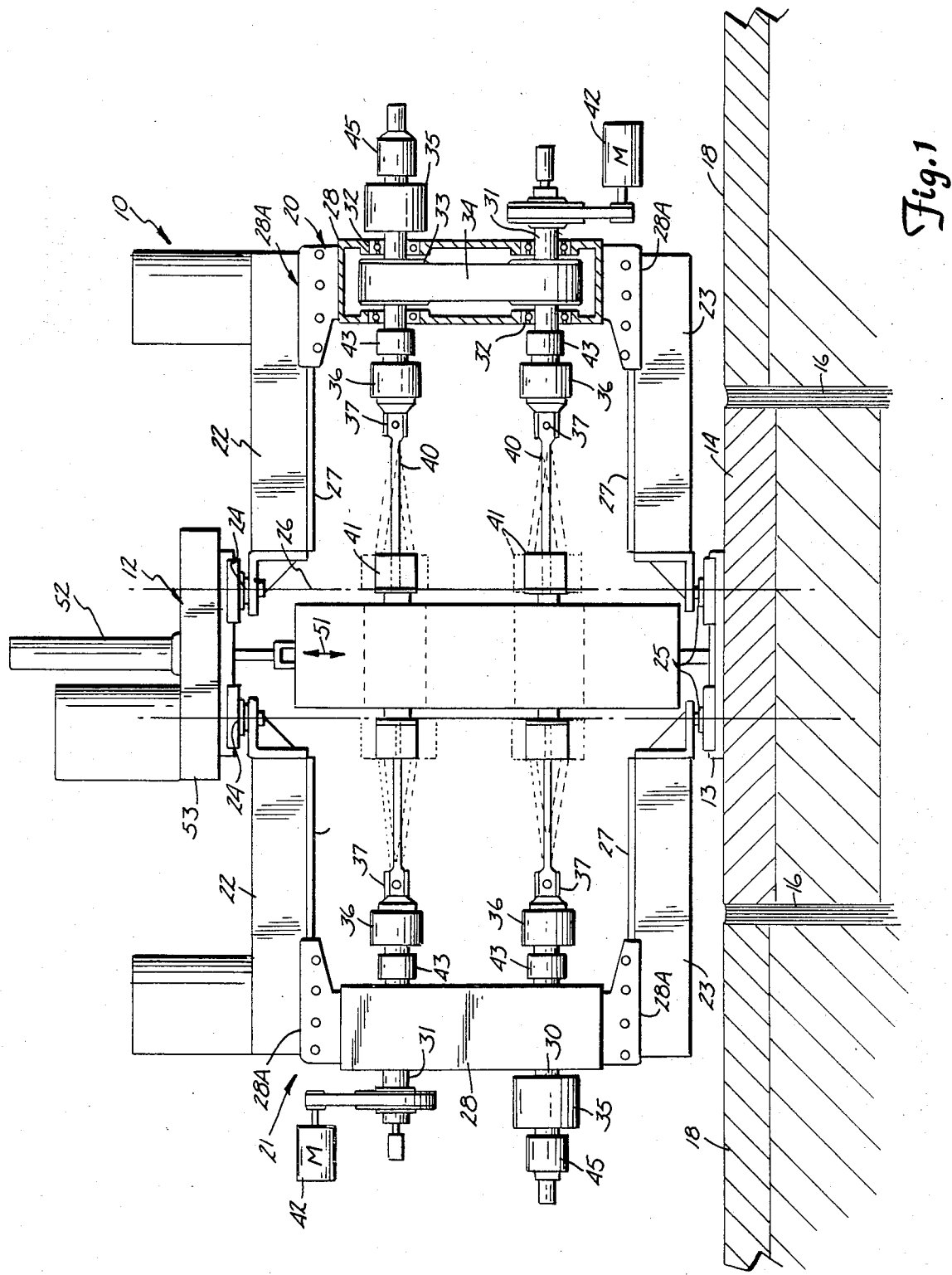
FIG. 1 is a schematic side elevational representation of a testing device made according to the present invention.

The frame 12 is shown only schematically in FIG. 1, but as shown is used to support a pair of specimen loading and drive frame assemblies 20 and 21 which are substantially identically constructed except being mirror images of each other. The loading and drive frame assemblies 20 and 21 include upper lateral support arms 22 and lower lateral support arms 23, which are each in turn pivoted with a suitable ball joint assembly indicated at 24 and 25 to the frame member 12. Support arms 22 are mounted to an upper part of the frame member 12 and support arms 23 are mounted to the lower plate 13 of the frame 12. The axes of pivoting of the support arms are shown at 26. The axis 26 for each loading and drive frame assembly is a vertical axis that provides the steer axis for the assembly as will be generally seen in FIG. 4, and explained in greater detail. Preferably, the axis 26 is positioned to coincide with the axis of steering of the test wheel hubs. Each set of the upper and lower lateral support arms 22 and 23 in turn support a belt housing 28 therebetween. The belt housings 28 are adjustably mounted on the respective support arms for movement toward and away from the axis 26 using suitable gibs and clamps on the arms 22 and 23.

Each housing 28 is made rigid enough to support a pair of parallel loading shafts 30 and 31, respectively, in suitable bearings indicated at 32. The shafts span the housings 28. On the interior of the housings 28 the shafts each mount a suitable cog belt pulley 33. A cog drive belt 34 extends between the pulleys so that there is a driving connection between the shafts 30 and 31.

The shafts 30 are assemblies of an outer tube and a concentric shaft rotatably mounted on the tube.

A rotary hydraulic actuator indicated generally at 35 is connected so that its outer housing is fixed to the outer tube forming part of shaft 30, the interior vanes of the actuator 35 are connected to the central shaft. The outer tube is mounted in the bearings and the upper pulley on the right side of the test assembly and the lower pulley on the left side are drivably mounted to the tube and the drive is through the actuator to the inner shaft. The inner shaft of the shaft assembly extends outwardly of he outer tube and the housing 28 toward the axis 26. The inner shaft in turn is connected to a torque measuring cell 36 of conventional design which is coupled to a universal joint 37 which also will accommodate axial movement of the connected axle. The "U" joint 37 connects to an axle assembly including an axle shaft 40, which has a wheel hub at its other end connected to a hub housing 41.

It can be seen that there are two rotary actuators 35, one on each side (the upper shaft on the right-hand side and the lower shaft on the left-hand side). Additionally, the shafts 31 on the lower right-hand and on the upper left-hand side are simultaneously driven under power through suitable electric motors 42. The use of two drive motors eliminates the friction effects on the drive components such as the bearings and belts. The four specimens and the shafts of both belt housings 28 can be rotated while the specimens are loaded under torque in the four square system. The axle shafts 40 are under torsion or torque load, as are the respective wheel hubs that are being tested. The torque cells 36 provided are conventional strain gage torque cells, and suitable slip ring assemblies 43 can be provided for transmission of electrical signals to and from the test specimens. Hydraulic commutator assemblies 45 are provided where necessary to carry hydraulic fluid under pressure to the rotary actuators 35 and provide return flow connections as well.

The wheel hub mounting housings indicated generally at 41 are mounted in a jounce framework schematically shown at 50 which comprises a center "jounce" section capable of being moved up and down in vertical direction as shown by the arrow 51. In order to accomplish jounce loading, a servovalve controlled, reciprocating hydraulic actuator 52 is mounted onto an upper support plate 53 of the frame 12. The actuator 52 has an actuator rod 54 that is reciprocated to carry the frame 50 with it in up and down alternating directions under controlled load at a desired frequency.

The jounce frame 50 which will be more fully explained permits loading the wheel hub assemblies 41 and the axles 40 under simulated vertical shock load inputs. The axles and wheel hubs comprising the test specimens are loaded in torque as explained and because the arms 22 and 23 can be moved about the pivot axis 26, steering angles can be applied to the universal joints in the test wheel hubs. Static and/or dynamic vertical loads and axial loads can also be applied in the frame 50 as will be explained.

SUPPORT FRAME CONSTRUCTION

Figure 2:
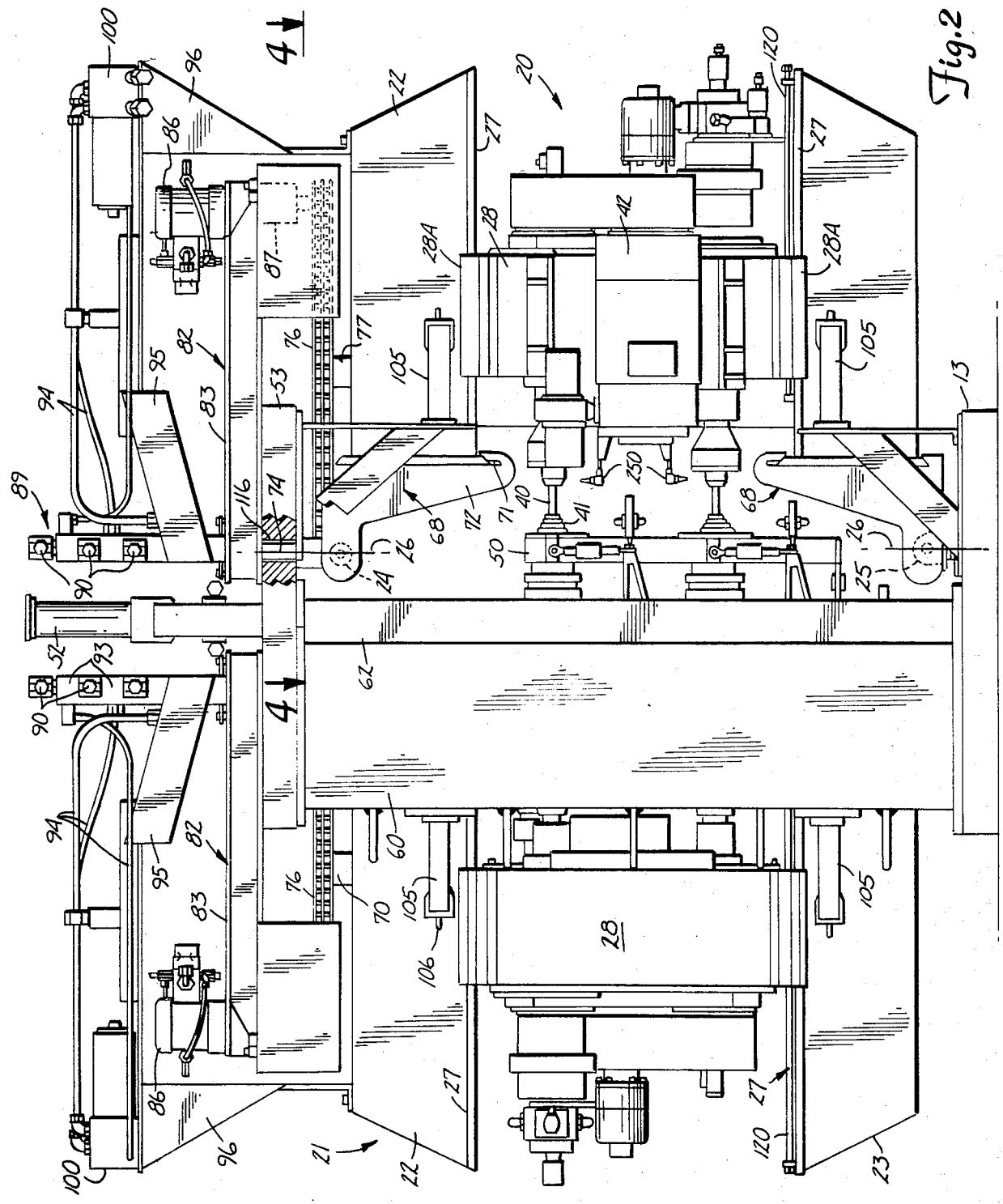
FIG. 2 is a more detailed side elevational view of the test device made according to the present invention.

In FIG. 2 a more detailed side view of the frame 12 is provided. The frame 12, as shown, includes a first upright column 60 at one end of the frame, and a second column 61 at the other end. The columns are bolted to and support top plate 53. Additionally, there are a pair of central upright posts 62, 62 which are spaced apart and which form guides and supports for the jounce loading section 50 that was shown schematically in FIG. 1 and which is also shown in FIG. 2.

Figure 4:
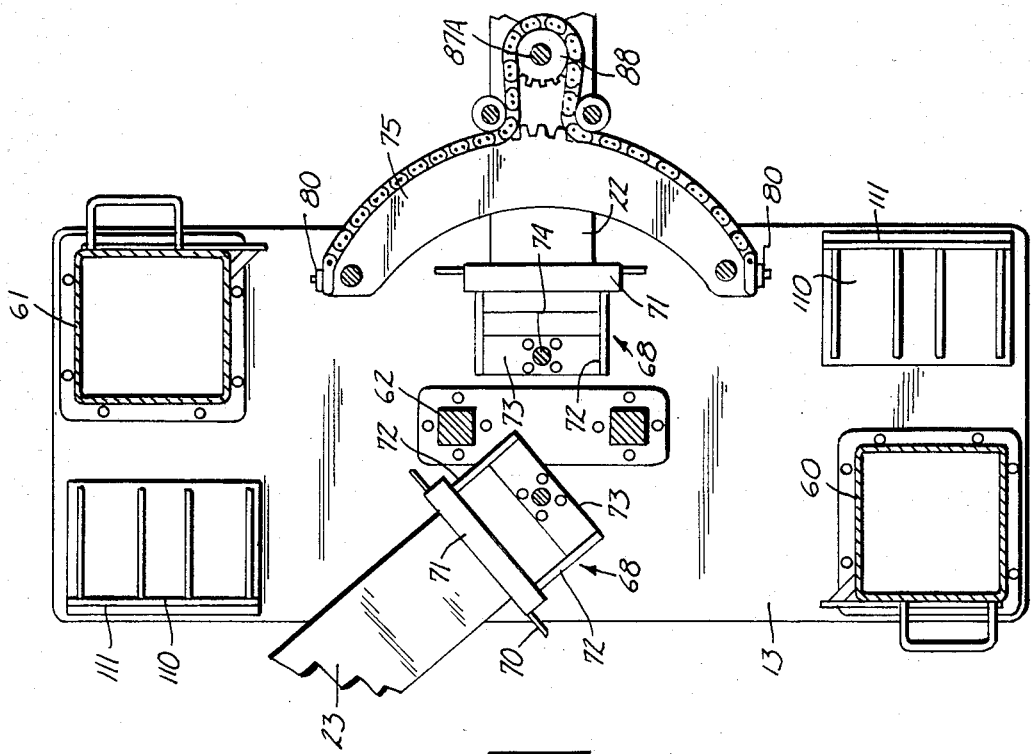
FIG. 4 is a sectional view taken generally along line 4—4 in FIG. 2.

The upright columns 60 and 61 are shown in section in FIG. 4, and it can be seen that they are square tubular members of substantial rigidity that are located at diagonally opposite corners of the base 13 and adjacent the lateral side edges. The columns are arranged so that the desired amount of steering movement can be accommodated, access to the jounce loading section 50 which is possible for specimen changing and servicing, and adequate support for the massive top plate 53 is provided.

The top plate 53 is supported on the top of the columns 60 and 61, and the posts 62, as shown in FIGS. 2 and 4 extends between the base 13 and the top plate 53 as well. The top plate 53 is fixedly connected to the post in a suitable manner as shown with cap screws for assembly purposes.

Figure 3:
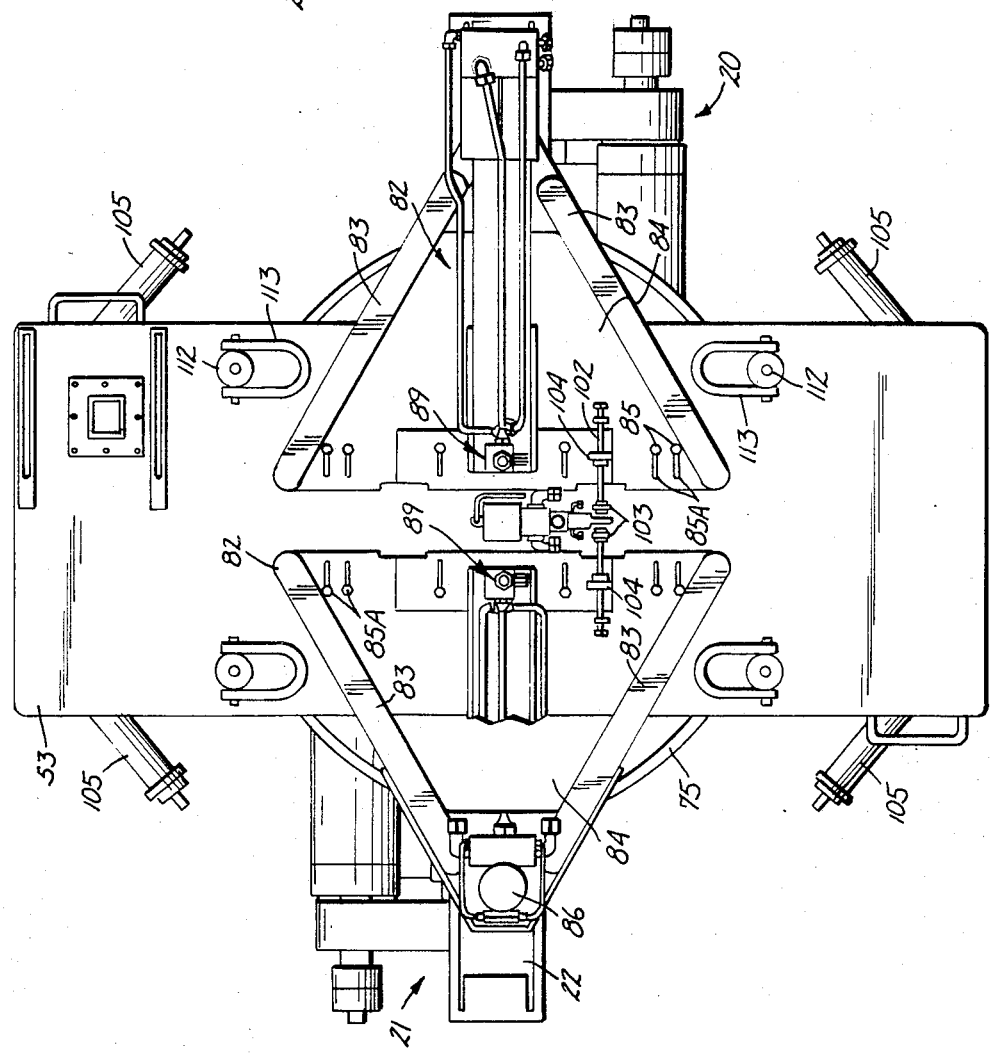
FIG. 3 is a top plan view of the device of FIG. 2 with parts broken away.

The drive and loading assemblies indicated at 20 and 21 in FIG. 1 are also indicated generally at 20 and 21 in FIGS. 2, 3 and 4. FIG. 4 is a fragmentary view of the upper support arms and associated components.

STEERABLE DRIVE AND LOADING ASSEMBLIES

The housing 28 on each of the loading assemblies 20 and 21 as stated slides back and forth along the upper lateral support arms 22 and the lower lateral support arms 23. The arms and housing 28 pivot as a unit on the supports 24 and 25, respectively. As stated previously, the supports 24 and 25 are ball joints that permit rotational movement about a vertical axis that is generally parallel to the posts 62. The ball joints will accommodate misalignment of the mounting studs or slight misalignment between the top and bottom pivots. The belt housings 28 are supported between the respective arms 22 and 23 on dove tail guideways or gibs 27, and a suitable clamp plate 28A on each side of each arm clamps the housing 28 in place. The housings 28 are shown in FIG. 2 almost all the way in toward the vertical axis indicated at 26, and in FIG. 1 almost all the way outwardly to illustrate the ability to accommodate specimens of greater length.

Again, the housings 28, the belts 34 and the associated shafts, pulleys, load cells and the like are utilized for loading torque in the specimens 40 in a known manner through rotary hydraulic actuators that load the specimens under the desired amount of torque, and that also permit changing this torque during rotation of the specimens because of the ability to control the rotary hydraulic actuators with servovalve controls.

FIG. 4 is a view looking downwardly just below the top plate 52. The upper and lower lateral arms 22 and 23 have plates 70 fixed to their ends and which extend transversely to the arms. The plates 70 have dove tail top and bottom edges that fit into suitable dove tail gibs 71 on brackets 68 which form part of the ball joint assemblies 24 and 25. The gibs 71 supporting plates 70 have clamps that can be tightened down or loosened to provide for transverse adjustment, that is, side to side adjustment of the arms 22 and 23 as shown in FIG. 4.

The brackets 68 have side plates 72, 72 that are connected to a support plate 73 which in turn mounts a socket to receive the ball of the top and bottom ball joint assemblies. A central shaft 74 supports the ball for the ball joint and passes upwardly through a wide slot 116 (FIG. 2) in the top plate 53. The shaft 74 is mounted in a suitable support housing above the top plate.

The support plate 73 mounts the socket for the ball joint in a normal manner. The brackets 68, including the side plates 72 and top plate 73 mount the transverse gib 71, and also support a large part circular sprocket sector 75 which is fixedly attached to the side plates 72 in a suitable manner. Each of the sprocket sectors 75 is also fixedly supported onto the upper support arm 22 of the respective drive and loading assemblies 20 and 21 with a suitable support block indicated at 77 (FIG. 2). The sprocket sectors 75 are used for controlling the pivotal position of the drive frame and loading assemblies 20 and 21 about the vertical axes 26. When the sprocket sectors 75 are pivoted they also move the respective ball joint bracket 68 and upper arm 22, and thus the lower arms 23 as well, which move with arms 22, to form the drive and loading assemblies.

As can be seen, a separate drive roller chain 76 is connected to each sprocket sector 75 and engage the teeth of the sprocket sectors for driving. The ends of chain 76 are clamped with suitable clamp mechanisms 80 to the opposite ends of the sprocket sectors (see FIG. 4). The support plates 73 are not shown in FIG. 4.

Now referring again to FIGS. 2 and 3, a separate frame assembly 82 is mounted on the top of plate 53 above each of the arms 22 and the respective drive and loading assemblies 20 and 21. The frame assemblies 82, as shown, comprise generally A-shaped frames having side members 83 that form the legs of an "A" and suitable plate members 84 that join the side frame members and rest against the upper surface of the main support plate 53. Suitable bolts 85 are provided for fixing the position of the A-frame members relative to plate 53. Slots 85A are provided for adjustment of the frames 82 inwardly and outwardly. The mounting shafts 74 for the ball joints are in housing mounted on plates 84 in a suitable manner so that the shafts 74 move horizontally with the respective A-frame member 82. Each of the shafts 74 is also mounted on plate 84 with a housing which permits moving the shafts 74 laterally in direction perpendicular to the movement provided by slots 85A. The housings for the shafts are bolted to the plate 84 through slots perpendicular to the slots 85A. The adjustment of the shafts 74 in two directions permits changing the axis of pivot of the arms 22 and 23 relative to the center of the test specimen to simulate actual conditions in use.

Each of the shafts 74 in turn mounts an upright hydraulic commutator assembly that is shown generally at 89 in FIGS. 2 and 3. The hydraulic commutator assemblies are constructed in a known manner to permit hydraulic fluid under pressure to be provided from the stationary base to the frame, pivoting drive and loading assemblies without flexing hoses.

In order to adjust the rotational or angular position of the drive frame and loading assemblies 20 and 21 about the upright axes 26, hydraulic motors 86 are mounted at the outer ends of the frames 82 in a suitable manner with the hydraulic motor shafts extending downwardly. Each motor shaft has a shaft extension mounted in a separate suitable bearing housing 87. The bearing housings 87 in turn mount internal shafts 87A that have sprockets indicated at 88 drivably mounted thereon at each side of the test machine. Drive sprockets 88 are capable of being rotatably driven by motors about an axis that is fixed with respect to the frames 82 and thus to the main frame assembly for the machine.

The separate chains 76 are drivably mounted over the respective sprockets 88 and the respective sprocket sectors 75. Suitable chain adjustment and chain guide sprockets can be provided so that the chain tension can be maintained at the desired level. When fluid under pressure is provided from a conventional pump through control servovalves selectively to the motor 86 of the respective drive frame and loading assemblies 20 and 21, the individual drive frame and loading assemblies 20 and 21, including the upper arms 22 and lower arms 23 and the beltbox assembly 28 supported thereon will be rotated about the respective axis 26 a desired amount by driving the sprockets 75 which turns or rotates the drive frame and loading assemblies on their ball joint supports.

In order to carry hydraulic fluid under pressure to the components that are mounted on the drive frame and loading assemblies 20 and 21, the hydraulic commutators 84 are used. The hydraulic commutators comprise a vertical fixed support having hydraulic oil connection ports indicated at 90 mounted thereon in vertically spaced locations. The fixed part of the hydraulic commutator assembly comprises a tube fixed as an extension of the shafts 74. The rotating part 91 has hydraulic commutator outlet connection members 93 interdigitated with the ports 90. The commutators are of conventional design adapted to carry hydraulic fluid under pressure from the non-rotating parts 90 and carry such fluid through the rotating outlet connection members 93 to suitable conduits indicated at 94. The rotating portion of commutator assemblies 89 each include a separate support arm 95 which has a horizontal section extending outwardly above the respective arm 22. Braces 96 connect to the support arms 95 and extend downwardly and are connected through a bracket 97 to the outer end of the respective upper arm 22.

Thus the drive frame and loading assemblies, the commutator sections 93, the support arms 95, and brackets 96 and 97 rotate or pivot as a unit when the motors 86 are driven to change the position of the drive frame and loading assemblies about their upright axes 26. The arm 95 supports the conduits carrying hydraulic fluid under pressure to a manifold arrangement 100 supported at the outer ends of the arms 95, and also provide support for the necessary electrical wires.

The adjustment of frame assemblies 82 in and out relative to the pivot axes 26, and thus also alignment adjustment of the ball joints 24 and 25 is accomplished by sliding the components in the slots 85A shown in FIG. 3, and then tightening suitable bolts 85. Additionally, screw adjusters indicated at 102 can be provided. These screw adjusters are anchored as at 103 to the top plate 53 of the frame 12, and thread through suitable brackets 104 on the movable a frames for permitting precise adjustment of the adjustable parts once the clamp bolts are loosened.

Safety stop members and energy dissipators or shock absorbers are provided for arresting movement of the drive frame and loading assemblies in each direction of pivot. As shown, the frame stop members 105 are located on opposite sides of each of the drive frame and loading assemblies 20 and 21 and include energy absorbing member 106. The stops are positioned so the side plates of the upper and lower arms 22 and 23 will engage these stops if the drive frame and loading assemblies swing too far. This is a particular safety factor in case the chain 76 breaks or some failure of a motor 86 would permit the drive frame and loading assemblies 20 and 21 to swing freely.

Two of the energy absorbing members 106 are mounted on the respective upright columns 60 and 61 of the main frame, and heavy duty support brackets indicated generally at 110 are supported on the top plate 53 to mount the other two stop members 105. The energy absorbing members 106 are also mounted on gibs 111 so that they can be adjusted laterally in and out for proper location in relation to the location of the drive frame and loading assemblies 20 and 21.

As shown in FIG. 3, the top plate 53 has suitable support pegs 112 and clevises 113 to permit lifting the plate 53 into position when it is to be assembled, after which the upper frames 82 are mounted in place along with the commutator assemblies 91 and the support for the mounting of the drive frame and loading assemblies. Brackets 68, including the side plates 72, are also used for mounting the lower arms 23 to the lower ball joints 25. The ball joints 25 are suitably mounted on a support plate 115 that can be adjusted in and out relative to the base 13 by use of slots and adjustment bolts and also the plate. On the top of top plate 53, clamping of the bolts 85 to plate 53 secures the position of respective shafts 74, which are attached to the frames 82. The shafts 74 extend through slots 116 formed in the top plate 53 to permit adjustment of the position of the upper ball joints.

It should also be noted that the in and out adjustment of the belt box frames 28 on the respective arms 22 and 23 can be initially accomplished through the use of a suitable lead screw adjuster indicated at 120 that can be threaded longitudinally once the clamps for the gibs or ways 27 are released so each beltbox frame 28 may slide in and out relative to its respective pivot axis 26.

The movement of the beltbox frames 28 in and out, as explained, is to accommodate different length specimens 40. Also, it can be seen that the movement controlled by the hydraulic motors 86 about the vertical axes 26 induces a steer movement in the specimens being tested. In particular, the universal joints 37 and 41 of the specimens being tested are then placed at an angle, and this steer axis can be changed readily by operating the motors 86 in accordance with a servovalve controlled program.

As stated, the center jounce frame assembly 50 is used for mounting one end of the specimens and subjecting them to a "jounce", which is a rapid, controlled reciprocal movement in vertical direction.

JOUNCE FRAME ASSEMBLY

The jounce frame assembly permits loading the wheel hub and bearing assemblies of automobiles, in particular front wheel drive wheel hub and bearing assemblies, under various loads simulating actual loading in operational conditions. As stated previously, the vertical or jounce actuator 52 is fixedly mounted to the top plate 53 and the actuator rod 54 extends downwardly through this top plate 53. The actuator 52 is a servocontrolled double acting hydraulic actuator that is capable of reciprocating the rod 54 at desired frequencies. The rod 54 shown in FIG. 6 comprises a rod section fixed to the frame assembly 50 in a suitable manner such as by bolting. The frame assembly 50 is the vertically movable frame member that operates as an assembly, and it is a bolted assembly utilizing tie rods or bolts that pass through a plurality of sections and hold the individual parts or sections under compression relative to each other to form the assembly. This permits replacing individual sections and also permits the rotating and loading parts to be serviced and replaced. The entire assembly is also stably guided with respect to the main frame of the machine, as will be explained.

Figure 6:
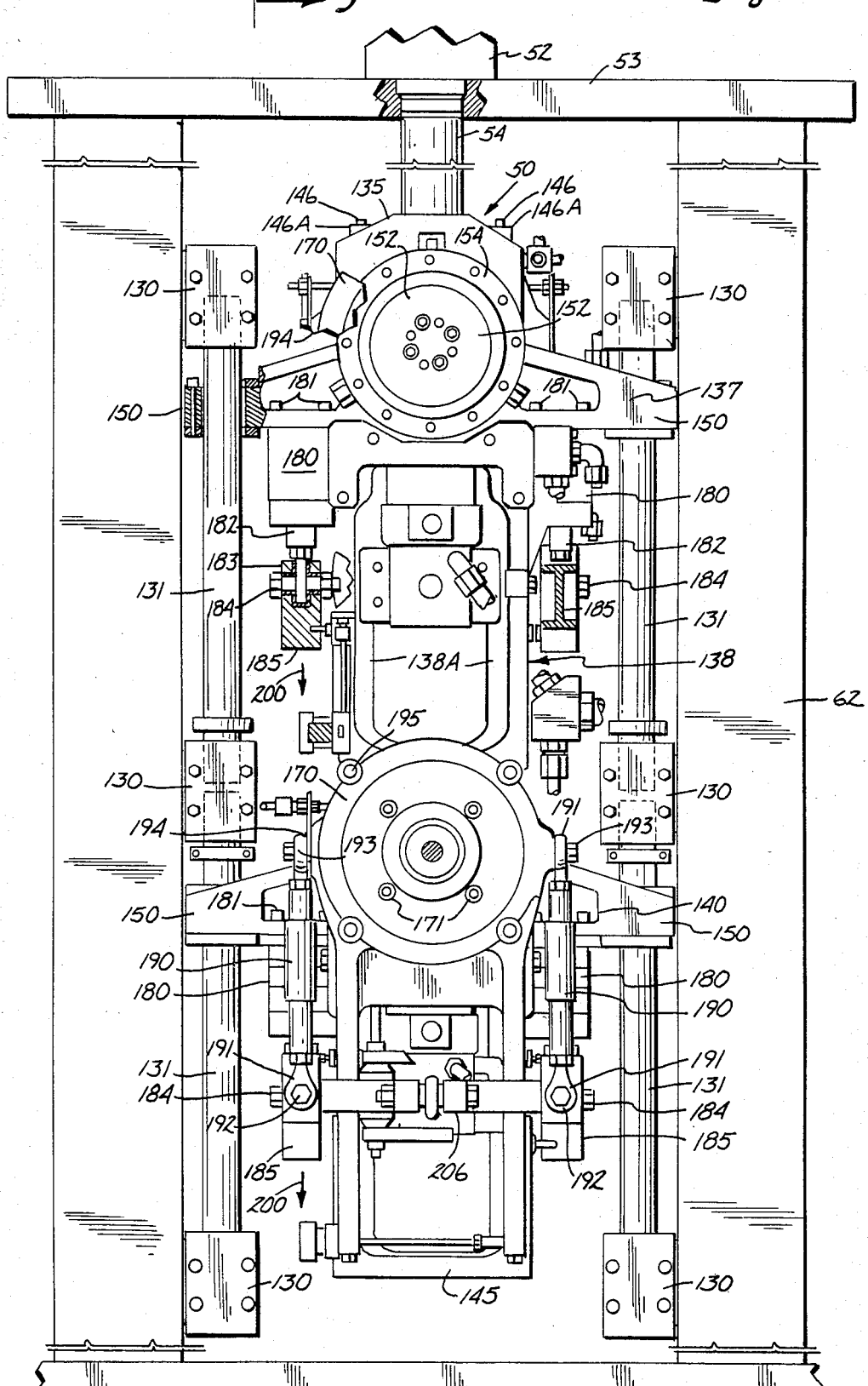
FIG. 6 is a sectional view taken along line 6—6 in FIG. 5.

Referring to FIG. 6, it can be seen that each of the posts 62 have clamp brackets 130 mounted thereon in three vertical spaced locations, and each of these clamp brackets 130 is utilized for clamping vertical guide shafts indicated generally at 131 on opposite sides of the frame assembly 50.

The shafts 131 on each side are split into two sections and the ends of the two sections are clamped in the center clamp 130, as shown. The shafts 131 have to be adequately supported to guide the frame 50 during jounce movement.

Figure 7:
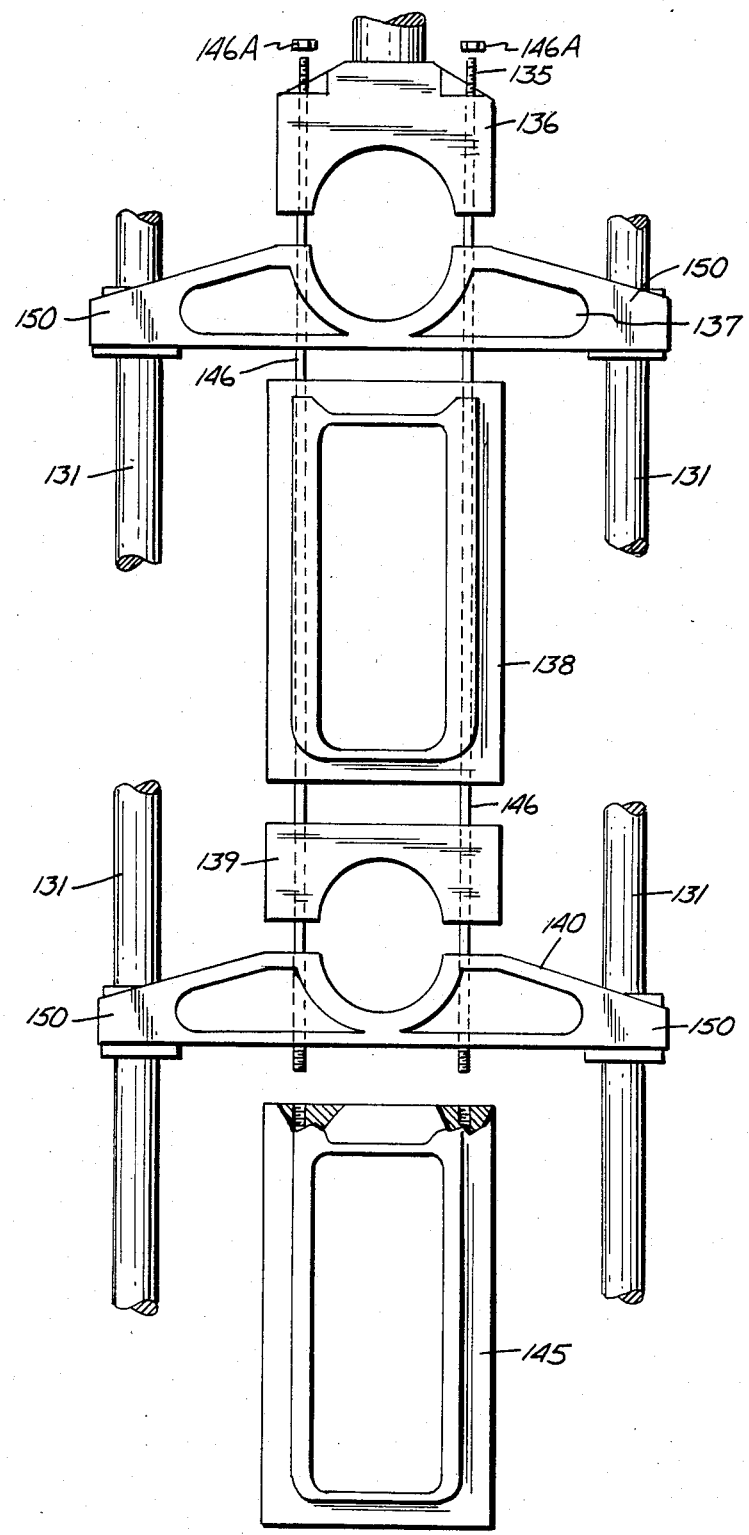
FIG. 7 is an exploded view of the center frame section taken generally along the same line as FIG. 6 with many parts removed for clarity.

As seen in FIGS. 5, 6 and 7, the frame 50 includes an upper attachment block 135 connected to rod 54 in a suitable manner. The block 135 in turn mates with an upper bearing housing clamp block 136 that mates with a cross beam guide block 137 that also mounts the lower half of the bearing housing for mounting the specimen as will be explained. The cross beam 137 is mounted on top of a spacer web 138 that mates along a lower surface of cross beam 137 as shown in FIG. 5. The web 138 has a pair of side legs 138A, 138A that connect upper and lower end supports. The legs of web 138 are also used for mounting loading components and as shown, extend downwardly to properly space a second bearing housing clamp block 139 for a lower bearing housing for supporting a second set of specimens. The lower bearing housing clamp block 139 in turn mates with a second cross beam 140 which forms the lower half of the lower bearing housing, and which is constructed in the same manner as the upper cross beam 137. Immediately below the lower cross beam 140 and in the center portions of the frame 50 a web block 145 mates against the underside of the cross beam 140. The web block 145 is constructed similarly to block 138, and has spaced legs that are used for mounting loading components, and a lower cross member. The upper end of block 145 has internal threads for threading in four tie rod bolts 146, which are spaced as shown perhaps best in FIG. 8, and which extend from the block 145 upwardly through cross beam 140, clamp block 139, spacer 138, cross beam 137, clamp block 136, and upper attachment block 135. The ends of the tie rods 146 extend out the top of attachment block 135 have nuts 146A that are used to tension the tie rods to cause the components just described to be held as a unit. It is a segmented assembly, held together by the tie rods 146 under compression forces the individual parts are illustrated in FIG. 7.

The cross beams 137 and 140 extend laterally outwardly beyond the center part of the jounce frame 50, and have housings 150 thereon which house suitable sleeve bearings and which slidably mount over the respective shaft sections 131. The cross beam 137 is the upper beam and is broken away in FIG. 6 to show the sleeve bearings.

Thus, any movement of the jounce frame 50 is guided precisely by the shafts 131, and there are no unwanted motions of this frame assembly.

SUPPORTS FOR ROTATING SPECIMENS

The test machine is designed to test four rotating front wheel drive hub and axle assemblies of automobiles. These drive hubs have universal joint drives, wheel bearings and supports that connect to the suspension system of the automobile. The wheel hubs also have brake mounting flanges. The center jounce frame 50 supports the test hubs through the wheel flange on rotatable bearing housings held in jounce frame 50. The upper specimen is supported in a bearing housing clamped between the bearing housing clamp block 136 and cross beam 137. The lower support is held between clamp block 139 and the cross beam 140. In FIG. 8, in particular, a typical bearing housing is shown at 150 supported in a clamp formed by cross beam 137. As can be seen the beam 137 has the tie bolts 146 passing therethrough. The bearing housing 149 extends out on opposite sides of the laterally extending cross beam 137, which in turn is guided on the upright shafts 131. A pair of taper roller bearings 151 are positioned at opposite ends of housing 149 and the bearings support a rotating specimen support 152. The specimen support 152 is made in two sections so that it can be assembled in place from opposite ends and held with suitable bolts 153 that extend longitudinally from one section to the other. The specimen support 152 in turn has outer flanges 154, 154 on opposite ends thereof which are positioned to the outside of the bearing housing 149. The rotating specimen support 152 rotates about a central axis 155. The flanges 154 have a plurality of tapped holes that are adapted to receive cap screws 156 for mounting a wheel hub adapter 157. The wheel hub adapter as shown is made so that it can be replaced for different types of test hubs and axles. The wheel hub adapter has a flange that receives the cap screws 156 and permits them to be threaded into the holes in the flange 154 of the specimen support.

The wheel hub adapter 157 has an inturned flange 160 that also has a plurality of openings that match the bolt holes for a wheel mounting flange 160A of a test specimen wheel hub indicated at 161. The wheel hub 161 as shown is a front wheel hub from a front wheel drive vehicle. The wheel mounting flange is mounted by bolts passing through the wheel hub adapter to connect it to the wheel hub adapter 160A. The wheel hub includes a hub sleeve that is rotationally driven by an axle shaft shown at 172 through a universal joint assembly on the interior of the hub sleeve. This hub sleeve is mounted in a bearing housing 162, which is the bearing housing supporting the wheel hub 161 for steering and driving movement in a front wheel drive vehicle.

The housing 162 is provided with a mounting flange 165 that again normally is mounted onto the steerable supports of the front wheel mounting assembly of a front wheel drive vehicle. The steerable supports are generally connected to the spring suspension system of the vehicle and thus move up and down substantially relative to the transmission and differential of such vehicle.

Flange 165 is mounted to a support drum 170 that has an inner bolt opening circle that receives cap screws 171 to fasten to the flange 165 in the same manner that the steerable support of an automobile fastens to this flange 165 in actual use. The drum 170 has a large central opening that permits the end of the wheel hub housing to extend therethrough. The axles 172 driving the test front wheel drive units are indicated at 172. The axles, as stated, are mounted through a universal joint assembly to the respective wheel hub that not only permits pivoting the hubs relative to the axis of the axles 172, but also rotationally drives the respective wheel hub. The axles 172 comprise the specimens 40 that are shown in FIG. 1. The interior construction of the universal joint assembly on the interior of the wheel hub sleeve can be in any desired construction. The construction is made by the companies that make the test specimens.

It can be seen that the bearing housing sections 152 are drivably coupled together with dowel pins as well as the bolts 153, so that in the four square test setup, the torque exerted by the belt and assemblies in the beltbox frames is transmitted across the rotating members 152 from one of the beltbox assemblies 28 to the other, and in this way the four square assembly permits reacting torque loading against the specimens themselves.

If the only need in testing was to load the wheel hub, drive axles and universal joint assemblies from the test specimens under torque, and then "jounce" them or move them vertically for testing, the only parts that would be necessary would be the rotating housing assemblies 149 supported in the frame 50, which can be moved vertically as described.

Operation of the cylinder 52 provides for the jouncing movement or in effect the vertical movement that would be encountered by the wheel hubs 161 under normal driving conditions.

However, in addition to jounce loads, there is also a vertical load on the wheel hubs because of the vehicle weight. In order to simulate this vertical loading, a loading linkage that is load isolated from the torque loading, is provided. "Load isolated" means that the vertical loads may be applied or changed without substantially affecting the other loads such as torque, being applied and such vertical loads will not vary significantly as the frame 50 is moved up and down, although shock loading from jounce will be present and will be compensated.

VERTICAL LOAD ASSEMBLY

The jounce frame 50, which comprises the individual sections held together with the tie rods 146, provides a substantial vertical space between the cross beams 137 and 140. Immediately below the cross beam 137, the filler or spacer web 138 is mounted which provides space for mounting actuators for applying vertical loads to the test specimens independently of the torque loads.

As shown in FIGS. 5 and 6, the cross beams 137 and 140, respectively, mount separate vertical actuators 180 outwardly of the edges of the webs 138 and 145 of the frame 50 and inwardly of the guide shafts 131. There are two vertical actuators 180 mounted to each of the cross beams, one on each side of the frame 50. For example, as shown in FIG. 6 on the left side of bearing 137, where parts have been broken away, the vertical actuator 180 is clearly visible. The vertical actuators 180 are centrally located on the plane of the cross beams, as can be seen in FIG. 5, and are held against the cross beams with suitable cap screws indicated at 181. The actuators 180 have housings that can be subjected to fluid under pressure, and each of the actuators 180 has an internal piston and an extendable and retractable rod 182. Each actuator rod 182 has a rod end 183, that is coupled with a pivot pin 184 to a separate equalizer beam 185. There are four such equalizer beams 185. The loading connections for an equalizer beam are perhaps best shown in FIG. 6 where the upper left actuator 180 is shown and the equalizer beam is shown in cross section down its center. The pin 184 is illustrated along with the rod end 183. On the right-hand side of the upper part of FIG. 6, the end of equalizer beam 185 has been broken away. Each of the equalizer beams 185 acts as an "evener" because it freely pivots about the axis of the connecting pivot pin 184.

A separate load-cell-link 190 is connected to each end of each evener beam. The load cells 190 as shown are links which carry axial load and also provide a signal that indicates the amount of load in a known manner. The load cells 190 have rod ends or spherical bearing ends 191 each of which is connected with a suitable pin 192 to the opposite ends of the respective evener beams for a total of eight such load cells 190. The opposite ends of the load cells from the evener beams have rod ends 191 as well, and these rod ends in turn are connected to transfer the vertical load from the actuators 180 through the evener beams and load cells to the wheel hubs under test. This is accomplished by connecting the rod ends 191 of the load cells 190 through suitable pins 193 to a load ring or hub 194 that surrounds each of the wheel hubs being tested, and which directly mounts the drums 170 (see FIG. 8). As can be seen, the drums 170 pilot into an inner opening in the loading ring 194 and the flange of 170 is clamped in place through the use of bolts 195. The equalizer beams 185 are broken away in the upper portion of FIG. 6, but the load cells 190, and the clamp bolts 195 connecting drum 170 to the load ring 194 are shown at the lower portion of FIG. 6.

Thus it can be seen that the vertical actuators 180, when actuated to extend their rods provide a vertical downward force as indicated by the arrow 200 in FIGS. 5 and 6. This load will be applied to the evener beams 185 and to the load cell-links 190 and transferred through the connecting bolts 193 to the load ring 194, and through the bolts 195 and drum 170 to the bearing support 165 that loads the wheel hub bearings of the test specimen wheel hub. The test wheel hub may thus be placed under a vertical load that is simulative of the normal vertical loads on front wheel drive units being tested. The vertical loads on the wheel hubs are reacted back through the rotating mounting housing 152 and the bearing housings 152 and the bearing housings 150 and through the respective cross beam 137 or 140 to the actuators 180.

The equalizer beams 185 assure that there are no torques or moments introduced into the loading of the test wheel hubs, and that both of the test specimens in each mounting housing 152 will be loaded equally. The loads applied on opposite sides of the same load ring by the load cells-links 190 will equalize because the actuators are connected in parallel hydraulically and equalize the forces.

In front wheel drive vehicles, there also are loads that act in direction along the rotating axis of the wheel hub, or essentially in direction along the axis 155 that is shown in FIG. 8 but offset by the wheel radius. In order to simulate this loading and to keep such loads isolated from both the vertical loads and the torque loads, the load rings 194 each have a pair of spaced apart legs which extend downwardly and which are called "banjo legs" because the load ring is similar in shape to the head of a banjo. These legs are shown at 201 and are perhaps best seen in FIG. 6. The legs 201 are also shown in FIG. 5 in side view. Two legs 201 are integral with each of the load rings 194 and thus they are connected to the drum 170 and through the drum to the support flanges 165 for the respective test wheel bearing housing.

The individual load rings 194 for loading each of the upper and lower rotating mounting housings 152 are loaded in axial direction along the axis of the actuators which are at the wheel radius from axis 151. That is, there is a load that either tends to separate or pull together the two legs 201 for one of the load rings 194 relative to the other load ring 194 for the same rotating mounting housing 152. This can be seen in FIGS. 5 and 9. The legs 201 each carry an adjustable saddle shown in FIG. 9 at 205 that permits a bracket assembly 206 to be moved up and down along the respective legs 201. It should be noted that the saddles 205 include screws 207 that are tightened to clamp the saddles 205 onto the legs 201 when the bracket assembly is in its proper place.

Each of the brackets 206 as shown is thus clamped in place on a respective pair of legs 201. The brackets 206 have a pair of bracket legs 210 that converge together in direction away from the legs 201, that is laterally outwardly. Bracket legs 210 are joined together at their outer ends with a cross loading bolt 211 that passes through not only the ends of the legs 210, but also through a rod end 212 of a load cell 213 that extends horizontally back toward the associated pair of legs 201. Note that the load cells 213 extend between a pair of cross straps 215 that are connected with bolts 214 to the legs 210. The straps serve to prevent the legs from collapsing together or spreading apart during loading. The opposite end of each load cell 213 has a rod end 216, which is connected with a suitable connecting bolt 217 to the rod end 218 on the rod 219 of a horizontal hydraulic actuator 220. The opposite end of the horizontal actuator 220 has a rod 221 that acts in opposite direction from the rod 219. Actuator 220 is a double actuator having two internal pistons that operate the respective rods 219 and 221. The actuator exerts force laterally in opposite directions along its axis, as shown for example by the arrows 224 in FIG. 5.

The rod ends 212 and 216 are spherical bearings, that will load along a horizontal axis and not place unwanted loads on the legs 212. The horizontal actuators 220 fit between the legs of the webs 138 and 145, respectively, and are held on the legs with suitable clamp set screw as shown in FIG. 9 at 225. The clamps permit the actuators 220 to be adjusted up and down along with the saddles 205 on the legs 201 to simulate loading at the correct wheel radius.

By providing fluid under pressure to the actuators 220, the actuators tend to spread the respective sets of legs 201 for each of the loading rings 194 outwardly and thus load the bearings mounting the test wheel hubs through the housing 165 in axial direction along the axis 155 at the wheel radius to cause both axial and moment loading along axis 155. The loads along axis 155 for a vehicle are at the tire patch contact with the ground. Thus, brackets 205 and actuators 220 can be set to apply the loads at the same radius as the tire used with the particular test specimen.

The specimens that are rotating, particularly when they are under a "steer" angle will tend to generate heat. To dissipate such heat, suitable nozzles indicated at 250 in FIG. 2 are provided, and compressed air from a source is blown through the nozzles onto the respective specimens on either side of the unit. The specimens mounted on the jounce section also may be subjected to cooling air in the same manner.

The loading, and drive, are under servo hydraulic control, using motors and actuators. The frequency of operation of the jounce section can be set as desired within reasonable limits, and the speed of rotation of motors 42 also can be controlled.

The unit can be steered during testing, and as stated can be adjusted to accommodate specimens of different lengths. This also aids in alignment of the various parts and also simulates the mounting geometry of the vehicle whose components are being tested.

In the drawings many of the conduits and lines for carrying hydraulic fluid to the various components are illustrated only fragmentarily. These are conventional and the closed loop servovalve controls likewise are of a conventional design.

What is claimed is:

1. A four square test apparatus for testing rotating specimens under torsion including a main frame, first means supported on said main frame for mounting at least one pair of test members to be tested for rotation about generally parallel, spaced axes, said first means comprising a subframe having at least a pair of support members, each support member extending laterally of the subframe and laterally of the axis of rotation of the test members on both sides of the subframe to form end guide portions, a pair of elongated guide members mounted on said main frame, the end guide portion of both support members on one lateral side of the subframe being slidably mounted on one of the guide members and the end guide portion of both support members on the other lateral side of the subframe being slidably mounted on the other of the guide members, means for loading said test members in torsion relative to each other while supported on said main frame, means for rotating said test members simultaneously, and means for moving said first means reciprocally as guided by the guide members during rotation of both of said test members.

2. The apparatus of claim 1 wherein said means for moving comprises a hydraulic actuator having a first portion mounted to said main frame and a second movable portion supporting said first means.

3. The apparatus of claim 2 wherein said means for loading said test members relative to each other comprise belt drive means between said test members.

4. The apparatus of claim 3 wherein there are belt drive means at both of the opposite ends of said test members, and said belt drive means comprises pulley members mounted to drive each end of each test member, a separate belt between the pulley members at opposite ends of said test members, and a pair of motors rotationally driving the test members from the opposite ends of the test members.

5. In a four square test arrangement including a main frame, and wherein a pair of rotating members for mounting specimens such as front wheel drive hubs for vehicles are mounted about separate parallel axes, and having means for loading at least one specimen in torsion, and including power means to rotate said specimen and rotating members when under torsion loading, the improvement comprising a center frame assembly mounted on said main frame for holding the specimen at desired locations, said center frame comprising a plurality of individual sections separable in direction along a first axis, said sections including individual separable sections for supporting and rotatably mounting said rotating members when assembled, and tension rod means connected to an end section at one end and passing through other sections; means at an end section at the other end of the assembly for permitting said tension rod means to be placed under tension for clamping the end sections toward center sections for placing the sections between the end sections under compression.

6. The apparatus of claim 5 wherein said sections include at least two bearing housing mounting sections spaced apart in direction along said first axis, said bearing housing mounting sections each including first and second portions separable in direction along said first axis, and wherein said tension rod means are threadably mounted in the section at one end and pass through provided openings in all of the other sections, the means at the end section at the other end loading said tension rod means against the end section at the other end to tend to force the opposite end sections together.

7. The apparatus of claim 5 wherein at least one of said sections extends outwardly beyond other sections on both sides of the center frame assembly, hub means on opposite ends of said at least one section, guide shaft means mounted on said main frame generally parallel to said first axis, said hub means being slidably guided over said guide rod means for guiding reciprocal movement of said center frame assembly formed from said plurality of sections.

8. A test stand for testing specimens that rotate and which also are capable of pivotal movement about an axis perpendicular to the axis of rotation comprising a main frame having an upper support and a base, a center subframe mounted on said main frame, means for rotatably supporting at least one specimen on said center subframe, a loading and drive frame assembly pivotally mounted to said main frame about a first axis generally perpendicular to the rotational axis of the one specimen, said loading and drive frame assembly comprising an upper arm pivotally mounted on the upper support and a lower arm pivotally mounted on said base, said arms extending outwardly from the first axis, and a drive housing connected to both of said arms and forming a structural member supporting the outer ends of the arms relative to each other, means for controlling pivotal movement of said loading and drive frame assembly about said first axis, and means for effecting a rotational drive to said specimen from the drive housing of said loading and drive frame.

9. The combination as specified in claim 8 wherein said center subframe comprises a reciprocally mounted subframe, and means for reciprocating said subframe relative to the main frame about an axis generally parallel to the axis of pivotal movement of the loading and drive frame assembly.

10. The apparatus of claim 9 wherein said center subframe includes means for rotatably mounting at least two rotating members about spaced apart axes that are generally parallel, said rotating members extending out from opposite sides of said center subframe, the drive housing of said first mentioned loading and drive frame assembly including means for rotatably, drivably engaging both of the rotatable members, first means at the opposite end of said rotating members from said loading and drive frame assembly for drivably connecting the rotating members together so that they will rotate simultaneously, and second means mounted in the drive housing of said loading and drive frame assembly for drivably coupling together the opposite ends of said rotating members for permitting loading both of the rotating members in torsion through said means for drivably coupling.

11. The apparatus of claim 10 wherein said rotating members each include a housing that is prevented from movement in direction along the axis of rotation of said rotating members, said specimens comprising wheel hub members having a wheel support hub attached to the rotating housings, said wheel hub members each having universal joint means directly connected to the wheel support hubs and a drive shaft extending therefrom, said wheel hub members including a mounting portion that is normally nonrotating relative to the wheel support hub when the wheel support hub is in use and rotating, a loading ring mounted to said mounting portion, and means for providing a force on said loading ring at a location spaced from the rotational axis of the wheel hub for loading said mounting portion in direction generally parallel to the axis of rotation of the rotating members to thereby place an axial load and moment on each wheel support hub while it rotates.

12. The apparatus of claim 10 wherein there are wheel hub members at opposite ends of each of said housings of the rotating members, and each of said wheel hub members has a mounting portion, and a separate loading ring mounted on each mounting portion, a separate pair of load equalizer beams for loading the wheel hub members on each housing, load applying means on the subframe for supporting each equalizer beam about axes perpendicular to both the first axis and the rotational axes of the wheel hub members of an associated housing and substantially midway between the loading rings on the wheel hub members of such associated housing, the equalizer beams extending generally parallel to the axis of rotation of the wheel hub members and having ends adjacent to the respective loading rings of the associated wheel hub member on the same rotating housing, and load link means between the opposite ends of the equalizer beams and a respective loading ring, said load applying means exerting force generally parallel to the reciprocating axis of the subframe.

13. The apparatus of claim 12 and leg members extending from each of the loading rings generally perpendicular to the axis of rotation of the rotating members from each of said loading rings, and hydraulic cylinder means for simultaneously loading said leg members of the loading rings for the wheel hub members on the same housing to tend to separate or move together such leg members for providing loads on said wheel hub members in direction along the rotating axis thereof.

14. The apparatus of claim 13 wherein said subframe assembly includes two sections having laterally extending end portions extending generally perpendicular to the axis of rotation of said rotating members, said load applying means comprising vertical actuator means mounted on the laterally extending portions, and the equalizer beams being coupled to said vertical actuator means for providing a load on said loading ring perpendicular to the axis of rotation of the wheel hub members independently of the loads applied axially to the wheel hub members.

15. A test stand for testing rotating members including a main frame, said main frame having a base plate and a top plate;

first and second loading frame assemblies mounted between said top plate and base plate along opposite sides of the main frame and extending laterally from said main frame, said first and second loading and drive frame assemblies, each comprising separate arms having inner ends pivotally mounted to the base plate and top plate respectively, and a drive housing movably supported on the arms of each loading and drive frame assembly spaced from the pivot axis thereof, said first and second loading and drive frame assemblies being respectively mounted for movement about pivotal axes that are generally perpendicular to the top plate and which are spaced apart from each other;

a subframe assembly, said subframe assembly including means for rotatably mounting at least two rotating members about generally parallel axes perpendicular to the pivot axes of said loading and drive frame assemblies;

vertical guide means mounted on said main frame;

means for slidably guiding said subframe assembly on said vertical guide means for movement generally parallel to the axes of pivot of said loading and drive frame assemblies;

said rotating members comprising housings having flanges at opposite ends thereof, and each of said housing flanges facing one of said loading and drive frame assemblies;

test specimen hub members mounted at each end of each rotating member, each test specimen hub member including a mounting flange and a relatively rotatable wheel hub portion, and a universal joint drive drivably coupled to the wheel hub portion, the flanges on the housings of the rotating members being directly coupled to the rotating wheel hub portions;

drive shaft means drivably coupled to said rotating wheel hub portions through the universal joints therein and extending to the respective adjacent loading and drive frame assembly;

means in the drive housings on the loading and drive frame assemblies coupled for simultaneous, drivably rotating the first and second rotating housings through said wheel hub portions and universal joints therein;

means for loading said wheel hub portions and the universal joints therein in torsion relative to each other;

means mounted on said top plate and connected to reciprocate said subframe assembly while said wheel hub portions are being rotated through said loading and drive frame assemblies;

a load ring mounted on the mounting flange of each of said test specimen hub members, said load rings restraining the mounting flange from rotation and including leg members extending generally perpendicular to the axis of rotation of the wheel hub portions;

actuator means for loading the legs of the load rings in direction generally parallel to the axis of rotation of the wheel hub portions;

means on said subframe for loading said load rings in direction generally perpendicular to the axis of rotation of the wheel hub portions independently to the loading parallel to the axis of such rotation; and means for sensing each of the torsion loads and the loads in direction parallel to and perpendicular to the axis of rotation of the wheel hub portions.

16. The apparatus of claim 15 and means for controlling the position of said loading and drive frame assemblies about their pivot axes to thereby cause the axis of the drive shaft means associated with such loading and drive frame assemblies to be positioned at an angle relative to the axis of rotation of the wheel hub portions mounted on said subframe.

17. The apparatus of claim 15 wherein said means for loading said loading rings in direction perpendicular to the rotational axis comprises:
- a pair of support members extending laterally from the subframe perpendicular to the rotational axes of the wheel hub portions and on opposite sides of said subframe;
- vertical hydraulic actuator means mounted on opposite sides of said subframe and positioned on the laterally extending portions;
- equalizer beam members on opposite sides of said subframe associated with each rotating member and having longitudinal axes generally parallel to the axes of rotation of said wheel hub portions and each beam member being coupled to one of said vertical actuator means through a single pivot generally perpendicular to the axis of rotation of said wheel hub portions to thereby comprise a load equalizer beam on each of the lateral sides of each of said rotating members; and
- link means connected the opposite ends of each equalizer beam member to the loading rings for the wheel hub portions comprising the test specimens at the opposite ends of the associated one of the rotating members, the link members from different equalizer beams associated with the same rotating member being connected on the opposite sides of one load ring and on opposite sides of the axis of rotation of the respective wheel hub portions.

18. The apparatus of claim 15 wherein the drive housings mounted between said arms on each loading and drive frame assembly are adjustably mounted on the respective arms for selective movement toward and away from the subframe, the drive housings each having rotating drive members mounted thereon about generally parallel axes:
- belt drive means between said rotating drive members in the same drive housing for transmitting torque and rotational drive forces between said rotating drive members;
- means for coupling said rotating drive members of each of the box means to a respective one of the drive shafts; and
- means for permitting loading one of the rotating drive members in torsion relative to the other in at least one of the drive housings.

19. The apparatus as specified in claim 18 wherein said means to mount the loading and drive frame assemblies to said top and base plates include means to permit adjustment of the axis of pivot of said loading and drive frame assemblies laterally relative to the subframe a limited amount.

* * * * *